US010592715B2

(12) United States Patent
Nadabar

(10) Patent No.: US 10,592,715 B2
(45) Date of Patent: Mar. 17, 2020

(54) SYSTEM AND METHOD FOR READING PATTERNS USING MULTIPLE IMAGE FRAMES

(71) Applicant: COGNEX CORPORATION, Natick, MA (US)

(72) Inventor: Sateesha Nadabar, Framingham, MA (US)

(73) Assignee: COGNEX CORPORATION, Natick, MA (US)

( * ) Notice: Subject to any disclaimer, the term of this patent is extended or adjusted under 35 U.S.C. 154(b) by 0 days.

(21) Appl. No.: 15/676,142

(22) Filed: Aug. 14, 2017

(65) Prior Publication Data
US 2018/0218190 A1 Aug. 2, 2018

Related U.S. Application Data

(63) Continuation of application No. 12/267,342, filed on Nov. 7, 2008, now Pat. No. 9,734,376.
(Continued)

(51) Int. Cl.
G06K 7/14 (2006.01)
G06K 7/10 (2006.01)

(52) U.S. Cl.
CPC ....... G06K 7/1491 (2013.01); G06K 7/10544 (2013.01); G06K 7/10861 (2013.01); G06K 7/14 (2013.01)

(58) Field of Classification Search
USPC ....................................................... 235/470
See application file for complete search history.

(56) References Cited

U.S. PATENT DOCUMENTS 3,868,634 A 2/1975 Dolch
3,890,597 A 6/1975 Hanchett
(Continued)

FOREIGN PATENT DOCUMENTS

DE 10012715 9/2000
EP 0571892 12/1993
(Continued)

OTHER PUBLICATIONS

US 6,768,414 B2, 07/2004, Francis (withdrawn)
(Continued)

Primary Examiner — Michael G Lee
Assistant Examiner — David Tardif
(74) Attorney, Agent, or Firm — Loginov & Associates PLLC

(57) ABSTRACT

This invention provides a system and method for decoding symbology that contains a respective data set using multiple image frames of the symbol, wherein at least some of those frames can have differing image parameters (for example orientation, lens zoom, aperture, etc.) so that combining the frames with an illustrative multiple image application allows the most-readable portions of each frame to be stitched together. And unlike prior systems which may select one "best" image, the illustrative system method allows this stitched image to form a complete, readable image of the underlying symbol. In an illustrative embodiment the system and method includes an imaging assembly that acquires multiple image frames of the symbol in which some of those image frames have discrete, differing image parameters from others of the frames. A processor, which is operatively connected to the imaging assembly processes the plurality of acquired image frames of the symbol to decode predetermined code data from at least some of the plurality of image frames, and to combine the predetermined code data from (Continued)

the at least some of the plurality of image frames to define a decodable version of the data set represented by the symbol.

10 Claims, 11 Drawing Sheets

Related U.S. Application Data

(60) Provisional application No. 60/987,463, filed on Nov. 13, 2007.

(56) References Cited

U.S. PATENT DOCUMENTS

| | | |
|---|---|---|
| 4,282,425 A | 8/1981 | Chadirma et al. |
| 4,308,455 A | 12/1981 | Bullis et al. |
| 4,408,344 A | 10/1983 | McWaters |
| 4,421,978 A | 12/1983 | Laurer et al. |
| 4,542,548 A | 9/1985 | Marazzini |
| 4,782,220 A | 11/1988 | Shuren |
| 4,866,784 A | 9/1989 | Barski |
| 4,894,523 A | 1/1990 | Chadirma et al. |
| 4,948,955 A | 8/1990 | Lee et al. |
| 4,973,829 A | 11/1990 | Ishida et al. |
| 5,028,772 A | 7/1991 | Lapinski et al. |
| 5,053,609 A | 10/1991 | Priddy et al. |
| 5,120,940 A | 6/1992 | Willsie |
| 5,124,537 A | 6/1992 | Chandler et al. |
| 5,124,538 A | 6/1992 | Lapinski et al. |
| 5,155,343 A | 10/1992 | Chandler |
| 5,163,104 A | 11/1992 | Ghosh et al. |
| 5,166,830 A | 11/1992 | Ishida et al. |
| 5,187,355 A | 2/1993 | Chadima et al. |
| 5,187,356 A | 2/1993 | Chadima et al. |
| 5,192,856 A | 3/1993 | Schaham et al. |
| 5,198,650 A | 3/1993 | Wike et al. |
| 5,262,623 A | 11/1993 | Batterman et al. |
| 5,262,625 A | 11/1993 | Tom et al. |
| 5,262,626 A | 11/1993 | Goren et al. |
| 5,262,652 A | 11/1993 | Bright et al. |
| 5,276,315 A | 1/1994 | Surka |
| 5,276,316 A | 1/1994 | Blanford |
| 5,278,397 A | 1/1994 | Barkan et al. |
| 5,286,960 A | 2/1994 | Longacre, Jr. et al. |
| 5,291,008 A | 3/1994 | Havens et al. |
| 5,296,690 A | 3/1994 | Chandler et al. |
| 5,304,786 A | 4/1994 | Pavlidis et al. |
| 5,304,787 A | 4/1994 | Wang |
| 5,332,892 A | 7/1994 | Li et al. |
| 5,378,883 A | 1/1995 | Batterman et al. |
| 5,412,197 A | 5/1995 | Smith |
| 5,418,862 A | 5/1995 | Zheng et al. |
| 5,420,409 A | 5/1995 | Longacre, Jr. et al. |
| 5,428,212 A | 6/1995 | Tani et al. |
| 5,446,271 A | 8/1995 | Cherry et al. |
| 5,455,414 A | 10/1995 | Wang |
| 5,461,417 A | 10/1995 | White et al. |
| 5,463,214 A | 10/1995 | Longacre, Jr. et al. |
| 5,478,999 A | 12/1995 | Figarella et al. |
| 5,481,098 A | 1/1996 | Davis et al. |
| 5,483,051 A | 1/1996 | Marchi |
| 5,486,689 A | 1/1996 | Ackley |
| 5,487,115 A | 1/1996 | Surka |
| 5,507,527 A | 4/1996 | Tomioka et al. |
| 5,510,603 A | 4/1996 | Hess et al. |
| 5,514,858 A | 5/1996 | Ackley |
| 5,523,552 A | 6/1996 | Shellhammer et al. |
| 5,539,191 A | 7/1996 | Ackley |
| 5,550,366 A | 8/1996 | Roustaei |
| 5,557,091 A | 9/1996 | Krummel |
| 5,591,956 A | 1/1997 | Longacre et al. |
| 5,612,524 A | 3/1997 | San't Anselmo et al. |
| 5,627,358 A | 5/1997 | Roustaei |
| 5,635,699 A | 6/1997 | Cherry et al. |
| 5,646,391 A | 7/1997 | Forbes et al. |
| 5,657,402 A | 8/1997 | Bender et al. |
| 5,675,137 A | 10/1997 | Van Haagen et al. |
| 5,682,030 A | 10/1997 | Kubon |
| 5,691,597 A | 11/1997 | Nishimura et al. |
| 5,723,853 A | 3/1998 | Longacre, Jr. et al. |
| 5,739,518 A | 4/1998 | Wang |
| 5,742,037 A | 4/1998 | Scola et al. |
| 5,744,790 A | 4/1998 | Li |
| 5,756,981 A | 5/1998 | Roustaei et al. |
| 5,767,497 A | 6/1998 | Lei |
| 5,767,498 A | 6/1998 | Heske, III et al. |
| 5,777,309 A | 7/1998 | Maltsev et al. |
| 5,780,834 A | 7/1998 | Havens et al. |
| 5,786,586 A | 7/1998 | Pidhirny et al. |
| 5,811,784 A | 9/1998 | Tausch et al. |
| 5,814,827 A | 9/1998 | Katz |
| 5,821,520 A | 10/1998 | Mulla et al. |
| 5,825,006 A | 10/1998 | Longacre, Jr. et al. |
| 5,852,288 A | 12/1998 | Nakazawa et al. |
| 5,872,354 A | 2/1999 | Hanson |
| 5,877,486 A | 3/1999 | Maltsev et al. |
| 5,880,451 A | 3/1999 | Smith et al. |
| 5,889,270 A | 3/1999 | Van Haagen et al. |
| 5,902,988 A | 5/1999 | Durbin |
| 5,914,476 A | 6/1999 | Gerst, III et al. |
| 5,920,060 A | 7/1999 | Marom |
| 5,929,418 A | 7/1999 | Ehrhart et al. |
| 5,932,862 A | 8/1999 | Hussey et al. |
| 5,936,224 A | 8/1999 | Shimizu et al. |
| 5,949,052 A | 9/1999 | Longacre, Jr. et al. |
| 5,992,744 A | 11/1999 | Smith et al. |
| 6,000,612 A | 12/1999 | Xu |
| 6,006,990 A | 12/1999 | Ye et al. |
| 6,021,380 A | 2/2000 | Fredriksen et al. |
| 6,021,946 A | 2/2000 | Hippenmeyer et al. |
| 6,053,407 A | 4/2000 | Wang et al. |
| 6,056,198 A | 5/2000 | Rudeen et al. |
| 6,075,883 A | 6/2000 | Stern et al. |
| 6,075,905 A | 6/2000 | Herman et al. |
| 6,078,251 A | 6/2000 | Landt et al. |
| 6,082,619 A | 7/2000 | Ma et al. |
| 6,088,482 A | 7/2000 | He et al. |
| 6,095,422 A | 8/2000 | Ogami |
| 6,123,261 A | 9/2000 | Roustaei |
| 6,141,033 A | 10/2000 | Michael et al. |
| 6,152,371 A | 11/2000 | Schwartz et al. |
| 6,158,661 A | 12/2000 | Chadima, Jr. et al. |
| 6,161,760 A | 12/2000 | Marrs |
| 6,176,428 B1 | 1/2001 | Joseph et al. |
| 6,189,792 B1 | 2/2001 | Heske, III |
| 6,206,289 B1 | 3/2001 | Sharpe et al. |
| 6,209,789 B1 | 4/2001 | Amundsen et al. |
| 6,234,395 B1 | 5/2001 | Chadima, Jr. et al. |
| 6,234,397 B1 | 5/2001 | He et al. |
| 6,250,551 B1 | 6/2001 | He et al. |
| 6,289,113 B1 | 9/2001 | McHugh et al. |
| 6,298,176 B2 | 10/2001 | Longacre, Jr. et al. |
| 6,334,060 B1 | 12/2001 | Sham et al. |
| 6,340,119 B2 | 1/2002 | He et al. |
| 6,371,373 B1 | 4/2002 | Ma et al. |
| 6,398,113 B1 | 6/2002 | Heske, III |
| 6,405,925 B2 | 6/2002 | He et al. |
| 6,408,429 B1 | 6/2002 | Marrion et al. |
| 6,446,868 B1 | 9/2002 | Robertson et al. |
| 6,454,168 B1 | 9/2002 | Brandt et al. |
| 6,490,376 B1 | 12/2002 | Au et al. |
| 6,491,223 B1 | 12/2002 | Longacre, Jr. et al. |
| 6,505,778 B1 | 1/2003 | Reddersen et al. |
| 6,512,714 B2 | 1/2003 | Hanzawa et al. |
| 6,513,714 B1 | 2/2003 | Davis et al. |
| 6,513,715 B2 | 2/2003 | Heske, III et al. |
| 6,561,427 B2 | 5/2003 | Davis et al. |
| 6,629,642 B1 | 10/2003 | Swartz et al. |
| 6,677,852 B1 | 1/2004 | Landt |
| 6,681,151 B1 | 1/2004 | Weinzimmer et al. |
| 6,698,656 B2 | 3/2004 | Parker et al. |
| 6,728,419 B1 | 4/2004 | Young |
| 6,761,316 B2 | 7/2004 | Bridgelall |

(56) References Cited

U.S. PATENT DOCUMENTS

| | | |
|---|---|---|
| 6,765,606 B1 | 7/2004 | Iddan et al. |
| 6,816,063 B2 | 11/2004 | Kubler |
| 6,913,199 B2 | 7/2005 | He |
| 6,919,793 B2 | 7/2005 | Heinrich |
| 7,044,378 B2 | 5/2006 | Patel et al. |
| 7,059,525 B2 | 6/2006 | Longacre, Jr. et al. |
| 7,061,524 B2 | 6/2006 | Liu et al. |
| 7,066,388 B2 | 6/2006 | He |
| 7,070,099 B2 | 7/2006 | Patel |
| 7,108,184 B2 | 9/2006 | Mase et al. |
| 7,121,467 B2 | 10/2006 | Winter |
| 7,175,090 B2 | 2/2007 | Nadabar |
| 7,181,066 B1 | 2/2007 | Wagman |
| 7,213,759 B2 | 5/2007 | Reichenbach et al. |
| 7,219,841 B2 | 5/2007 | Biss |
| 7,227,628 B1 | 6/2007 | Sullivan et al. |
| 7,460,130 B2 | 12/2008 | Salganicoff |
| 7,498,566 B2 | 3/2009 | Kasper et al. |
| 7,604,174 B2 | 10/2009 | Gerst et al. |
| 7,609,846 B2 | 10/2009 | Smith et al. |
| 7,614,554 B2 | 11/2009 | Mott et al. |
| 7,774,075 B2 | 8/2010 | Lin |
| 8,737,721 B2 | 5/2014 | Arcas et al. |
| 8,858,856 B2 | 10/2014 | Kozlak |
| 2001/0042065 A1 | 11/2001 | Sasaki et al. |
| 2001/0042789 A1 | 11/2001 | Krichever et al. |
| 2002/0044689 A1 | 4/2002 | Roustaei et al. |
| 2002/0171745 A1 | 11/2002 | Ehrhart |
| 2003/0006290 A1 | 1/2003 | Hussey et al. |
| 2003/0062418 A1 | 4/2003 | Barber et al. |
| 2003/0090586 A1 | 5/2003 | Jan et al. |
| 2003/0117511 A1 | 6/2003 | Belz et al. |
| 2003/0121978 A1 | 7/2003 | Rubin et al. |
| 2003/0195749 A1 | 10/2003 | Schuller |
| 2003/0201328 A1 | 10/2003 | Jam et al. |
| 2004/0020990 A1 | 2/2004 | Havens et al. |
| 2004/0026508 A1 | 2/2004 | Nakajima et al. |
| 2004/0091255 A1 | 5/2004 | Chase et al. |
| 2005/0180804 A1 | 8/2005 | Andrew et al. |
| 2005/0194447 A1 | 9/2005 | He et al. |
| 2005/0263599 A1 | 12/2005 | Zhu et al. |
| 2005/0275831 A1 | 12/2005 | Silver |
| 2005/0275897 A1 | 12/2005 | Fan et al. |
| 2006/0022052 A1* | 2/2006 | Patel ................. G06K 7/10722 235/462.26 |
| 2006/0027657 A1 | 2/2006 | Nunnink et al. |
| 2006/0027661 A1 | 2/2006 | Hosoi et al. |
| 2006/0050961 A1 | 3/2006 | Thiyagarajah |
| 2006/0131418 A1 | 6/2006 | Testa |
| 2006/0131419 A1 | 6/2006 | Nunnink |
| 2006/0132787 A1 | 6/2006 | Mestha et al. |
| 2006/0133757 A1 | 6/2006 | Nunnink |
| 2006/0283952 A1 | 10/2006 | Wang |
| 2006/0249581 A1 | 11/2006 | Smith et al. |
| 2006/0249587 A1 | 11/2006 | Choi et al. |
| 2006/0285135 A1 | 12/2006 | Mestha et al. |
| 2007/0181692 A1* | 8/2007 | Barkan .............. G06K 7/10722 235/462.41 |
| 2008/0004822 A1 | 1/2008 | Nadabar et al. |
| 2008/0011855 A1 | 1/2008 | Nadabar |
| 2008/0019615 A1 | 1/2008 | Schnee et al. |
| 2008/0143838 A1 | 6/2008 | Nadabar |
| 2009/0090781 A1 | 4/2009 | Ye et al. |
| 2009/0121027 A1 | 5/2009 | Nadabar |

FOREIGN PATENT DOCUMENTS

| | | |
|---|---|---|
| EP | 0896290 | 10/2004 |
| EP | 1469420 | 10/2004 |
| EP | 1585052 | 10/2005 |
| EP | 1975849 | 1/2008 |
| JP | H10-40327 | 2/1998 |
| JP | 2005-276119 | 10/2005 |
| WO | 09613797 | 5/1996 |
| WO | WO200215120 | 2/2002 |
| WO | 02075637 | 9/2002 |
| WO | 03102859 | 12/2003 |
| WO | WO06052884 | 5/2006 |
| WO | 20080118419 | 10/2008 |
| WO | 20080118425 | 10/2008 |

OTHER PUBLICATIONS

Automatic I.D. News, Serving users of optical, magnetic, radio frequency, voice recognition systems, an HBJ Publication, Oct. 1986.

"http://www.merriam-webster.com/dictionary/optimal", p. 1, Oct. 27, 2008.

"International Standard", ISO/IEC 16022 First Edition May 1, 2000—Reference No. ISO/IEC 16022:2000(E), Information Technology—International symbology Specification—Data Matrix, May 1, 2000.

"SAE Aerospace Standar AS9132", International Aerospace Quality Group (IAQG), Verification Standard, Feb. 2002.

Cognex, Coporation , "Implementing Direct Par Mark Identification: 10 Important Considerations", ID Products, 2004, 1-12.

Cognex Technology and Investment, "International Preliminary Report on Patentability Chapter I (IB/373)", PCT/US2007/073575, Jan. 20, 2009.

Cognex Technology and Investment, ,"Written Opinion of the International Search Authority", PCT/US2007/073575, Jan. 17, 2009.

Rolls-Royce, ,"Direct Part Marking", Implementation Guide, Issue 1—Vcom 9897, Jun. 2004.

Stevenson, Rick , "Laser Marking Matrix Codes on PCBS", Printed Circuit Design & Manufacture, Dec. 2005, 32, 34, 36.

Taniguchi, R-I et al., "A Distributed-Memory Multi-Thread Multi-processor Architecture for Computer Vision and Image Processing: Optimized Version of AMP", System Sciences, Los Alamitos, CA, 1993, 151-160.

Wittenburg, J.P. et al., "A Multithreaded Architecture Approach to Parallel DSP's for High Performance Image Processing Applications", Signal Processing Systems, Piscataway, NJ, 1999, 241-250.

\* cited by examiner

SYSTEM AND METHOD FOR READING PATTERNS USING MULTIPLE IMAGE FRAMES

RELATED APPLICATION

This application is a continuation of U.S. patent application Ser. No. 12/267,342, filed Nov. 7, 2008, titled "System and Method for Reading Patterns Using Multiple Image Framers," which claims the benefit of U.S. Provisional Application Ser. No. 60/987,463, filed Nov. 13, 2017, entitled "System and Method for Reading Patterns Using Multiple Image Framers", by Sateesha Nadabar, the entire disclosure of both are herein incorporated by reference.

FIELD OF THE INVENTION

This invention relates to systems and methods for reading symbology and other predetermined patterns using machine vision.

BACKGROUND OF THE INVENTION

Machine vision systems use image acquisition devices that include camera sensors to deliver information on a viewed subject. The system then interprets this information according to a variety of algorithms to perform a programmed decision-making and/or identification function. For an image to be most-effectively acquired by a sensor in the visible, and near-visible light range, the subject is typically illuminated.

In the example of symbology reading (also commonly termed "barcode" scanning) using an image sensor, proper illumination is highly desirable. Symbology reading entails the aiming of an image acquisition sensor (CMOS camera, CCD, etc.) at a location on an object that contains a symbol (a "barcode"), and acquiring an image of that symbol. The symbol contains a set of predetermined patterns that represent an ordered group of characters or shapes from which an attached data processor (for example a microcomputer) can derive useful information about the object (e.g. its serial number, type, model, price, etc.). Symbols/barcodes are available in a variety of shapes and sizes. Two of the most commonly employed symbol types used in marking and identifying objects are the so-called one-dimensional barcode, consisting of a line of vertical stripes of varying width and spacing, and the so-called two-dimensional barcode consisting of a two-dimensional array of dots or rectangles.

By way of background, FIG. 1 shows an exemplary scanning system 100 adapted for handheld operation. An exemplary handheld scanning appliance or handpiece 102 is depicted. It includes a grip section 104 and a body section 106. An illuminator 120, in the form of a light pipe in this example, is provided to direct light of an appropriate wavelength and angle onto an object 130 containing an illustrative two-dimensional barcode 132 on its surface. An image formation system 151, shown in phantom, can be controlled and can direct image data to an onboard embedded processor 109. This processor can include a scanning software application 113 by which lighting is controlled, images are acquired and image data is interpreted into usable information (for example, alphanumeric strings) derived from the arrangement of light and dark elements within the exemplary barcode symbol 132.

The decoded information can be directed via a cable 111 to a PC or other data storage device 112 having (for example) a display 114, keyboard 116 and mouse 118, where this information can be stored and further manipulated using an appropriate PC-based application. Alternatively, the cable 111 can be directly connected to an interface in the scanning appliance and an appropriate interface in the computer 112. In this case the remote computer-based application (not shown) performs various image interpretation/decoding and lighting control functions as needed. The particular arrangement of the handheld scanning appliance with respect to an embedded processor, computer or other processor is highly variable. For example, a wireless interconnect can be provided by which no interconnecting cable 111 is required. Likewise, the depicted microcomputer can be substituted with another processing device, including an onboard processor or a miniaturized processing unit such as a personal digital assistant or other small-scale computing device.

The scanning application 113 can be adapted to respond to inputs from the scanning appliance 102. For example, when the operator toggles a trigger 122 on the hand held scanning appliance 102, an internal camera image sensor (within the image formation system 151) acquires an image of a region of interest surrounding the subject barcode 132. The exemplary region of interest includes the two-dimensional symbol 132 that can be used to identify the object 130, or some other characteristic. Identification and other processing functions are carried out by the scanning application 113, based upon image data transmitted from the hand held scanning appliance 102 to the processor 109. A visual indicator (not shown) or other indicia can be illuminated by signals from the processor 109 to indicate successful reading and decoding of the symbol 132.

In reading symbology or other subjects of interest, the geometry of the particular symbol on the underlying surface is of particular concern. Where the symbol and/or other viewed subject is printed on a flat surface with contrasting ink or paint, the reading of the entire symbology pattern may be relatively straightforward, using a given sensor and lens setting, and appropriate levels and angles of illumination.

Conversely, where a symbol or other subject is formed on a more-irregular surface, and/or is created by etching or peening a pattern directly on the surface, the acquired image of the symbol may exhibit significant irregularity across its surface. In the present example, as detailed in FIG. 1, the object 130 defines a cylindrical surface that causes an acquired image 160 of the symbol 132 to exhibit a faded or unreadable appearance at its edges. This results from the differential reflection and/or scattering of light due to the continually varying angle of the underlying cylindrical surface. As such the image is largely readable in its middle, while being less-readable, or unreadable, at its edges. Clearly other geometries and/or surface finishes can yield differing reading problems with respect to the acquired image.

Another example of an instance in which surface, lighting or other variations can result in a partially unreadable symbol is shown in FIG. 2. In this example, the system 200 derives images from exemplary objects 210, 212, 214 provided in a moving line that can include a conveyor 220. This arrangement is similar to that described in commonly assigned, copending U.S. Published Patent Application No. US20050275831A1, entitled METHOD AND APPARATUS FOR VISUAL DETECTION AND INSPECTION OF OBJECTS, by William M. Silver, the teachings of which are expressly incorporated by reference. In this arrangement, relative movement between a machine vision detector 230 (or other imaging device) and the objects 210, 212, 214 occurs, with each object and a feature of interest (symbols 240, 242 and 244) being imaged in turn. A machine vision application, embedded in the processing circuitry of the detector 230, or in a remote computer 250, derives an image of the subject feature/symbol. As shown, the derived image 252 is partially unreadable due to the surface shape of the object, and hence, unreadable. While the exemplary machine vision detector may acquire multiple images of the object/feature of interest as it passes through the field of view, each image is used individually to perform a detection and/or triggering function.

In general, only a single image of the symbol is acquired to derive the information from the symbol in each of the above-described implementations. Any faded, or otherwise unreadable, regions in this image will result in a bad read of the symbol. This problem may be addressed, in part, by applying different types of illumination to the subject, from which the most-readable image is derived. By way of further background, commonly assigned U.S. patent application Ser. No. 11/014,478, entitled HAND HELD SYMBOLOGY READER ILLUMINATION DIFFUSER and U.S. patent application Ser. No. 11/019,763, entitled LOW PROFILE ILLUMINATION FOR DIRECT PART MARK READERS, both by Laurens W. Nunnink, the teachings of which are expressly incorporated herein by reference, provide techniques for improving the transmission of bright field (high angle) and dark field (low angle) illumination so as to provide the best type of illumination for viewing a particular subject. These techniques include the provision of particular geometric arrangements of direct, bright field LEDs and conical and/or flat diffusers that are placed between bright field illuminators and the subject to better spread the bright field light. The above-incorporated HAND HELD SYMBOLOGY READER ILLUMINATION DIFFUSER further teaches the use of particular colors for improving the illumination applicable to certain types of surfaces. Still, these techniques rely on the choice of the best (potentially most-readable) image from a plurality of acquired images, each taken under differing conditions.

In general, the typical practice of acquiring a single image (or multiple images in which only the "best" single image is chosen) often produces an acquired image in which at least part of the image is difficult, or impossible, to read. Accordingly, it is desirable to provide a system and method for enabling the reading of symbols and other predetermined forms of images that better addresses the existence of faded/unreadable regions, and other irregularities due to varying surface, lighting and other conditions on the underlying surface.

SUMMARY OF THE INVENTION

This invention overcomes the disadvantages of the prior art by providing a system and method for decoding symbology that contains a respective data set using multiple image frames of the symbol, so that combining the frames with an illustrative multiple image application allows the most-readable portions of each frame to be stitched together. And unlike prior systems which may select one "best" image, the illustrative system method allows this stitched representation to form a complete, readable image of the underlying symbol. In one illustrative embodiment, at least some of those frames can be characterized by differing image parameters (for example orientation, lens zoom, aperture, etc.). In another illustrative embodiment, the multiple image frames can be acquired with the same parameters and the most-readable elements of each image are stitched together, thereby overcoming inherent variations in the image resulting from electronic noise, and the like.

According to an illustrative embodiment, the system and method for decoding symbology that represents a data set on an object includes an imaging assembly that acquires multiple image frames of the symbol. A processor, which is operatively connected to the imaging assembly processes the plurality of acquired image frames of the symbol to decode predetermined code data from at least some of the plurality of image frames, and to combine the predetermined code data from the at least some of the plurality of image frames to define a decodable version of the data set represented by the symbol. In the illustrative embodiment, the multiple-imaging procedure includes a symbology-decoding procedure that decodes the predetermined code data in respective of the plurality of image frames, and the multiple-imaging procedure being further constructed and arranged to determine a successful, or unsuccessful, decoding of the symbol based upon, respectively, whether combining the predetermined code data in the respective of the plurality of image frames defines, or does not define, a complete data set represented by the symbol.

In this embodiment, the multiple-imaging procedure is further constructed and arranged to indicate the successful decoding of the symbol, when a predetermined number of image frames that is less than or equal to a maximum number of image frames from the plurality of image frames, is decoded to define the complete data set. The imaging assembly can be constructed and arranged to acquire at least some of the image frames from a plurality of different orientations with respect to the symbol and so that the image parameters comprise each of the plurality of different orientations. In an embodiment, the assembly can be a handheld reader that is swept over a symbol to acquire images at different orientations/parameter settings, a plurality of imagers located at differing orientations, or a moving symbol/object relative to a substantially stationary imaging assembly, which acquires images as the objects moves through its field of view.

BRIEF DESCRIPTION OF THE DRAWINGS

The invention description below refers to the accompanying drawings, of which.

DETAILED DESCRIPTION

Figure 3:
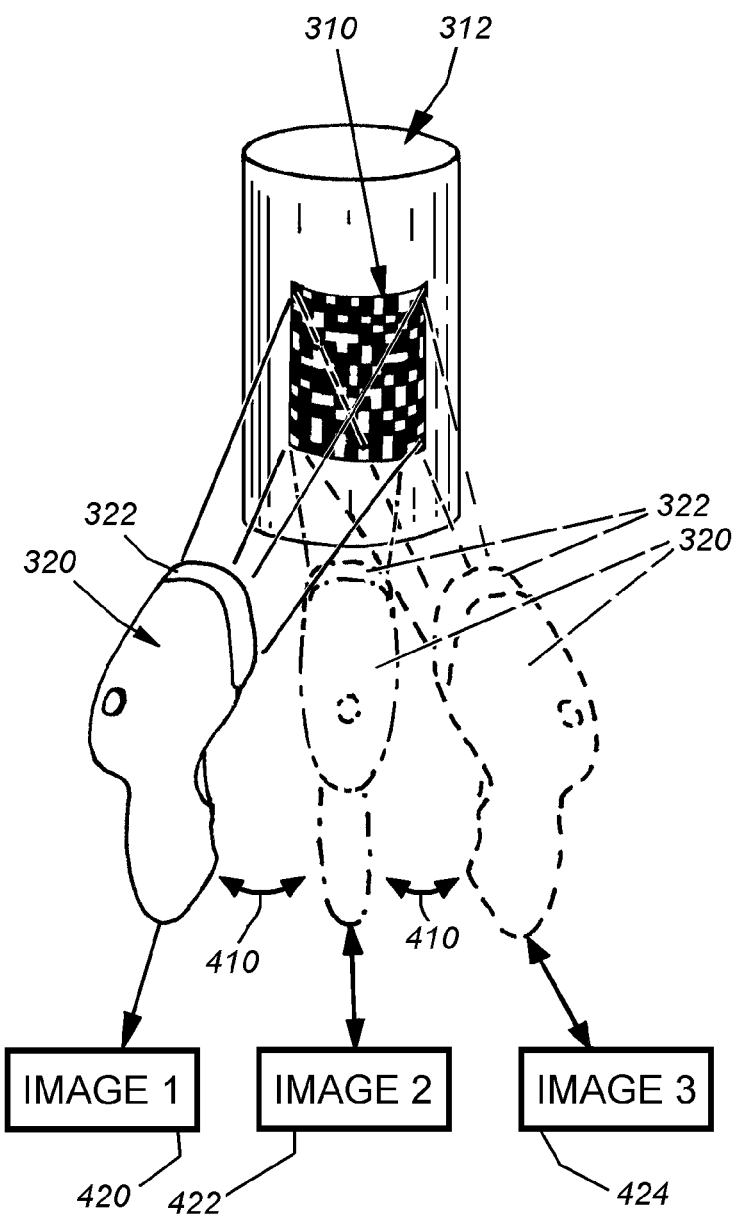
FIG. 3 is a perspective view of a single handheld symbology reader acquiring multiple image frames of a predetermined symbol located on an irregular, curved surface of an object.
Figure 4:
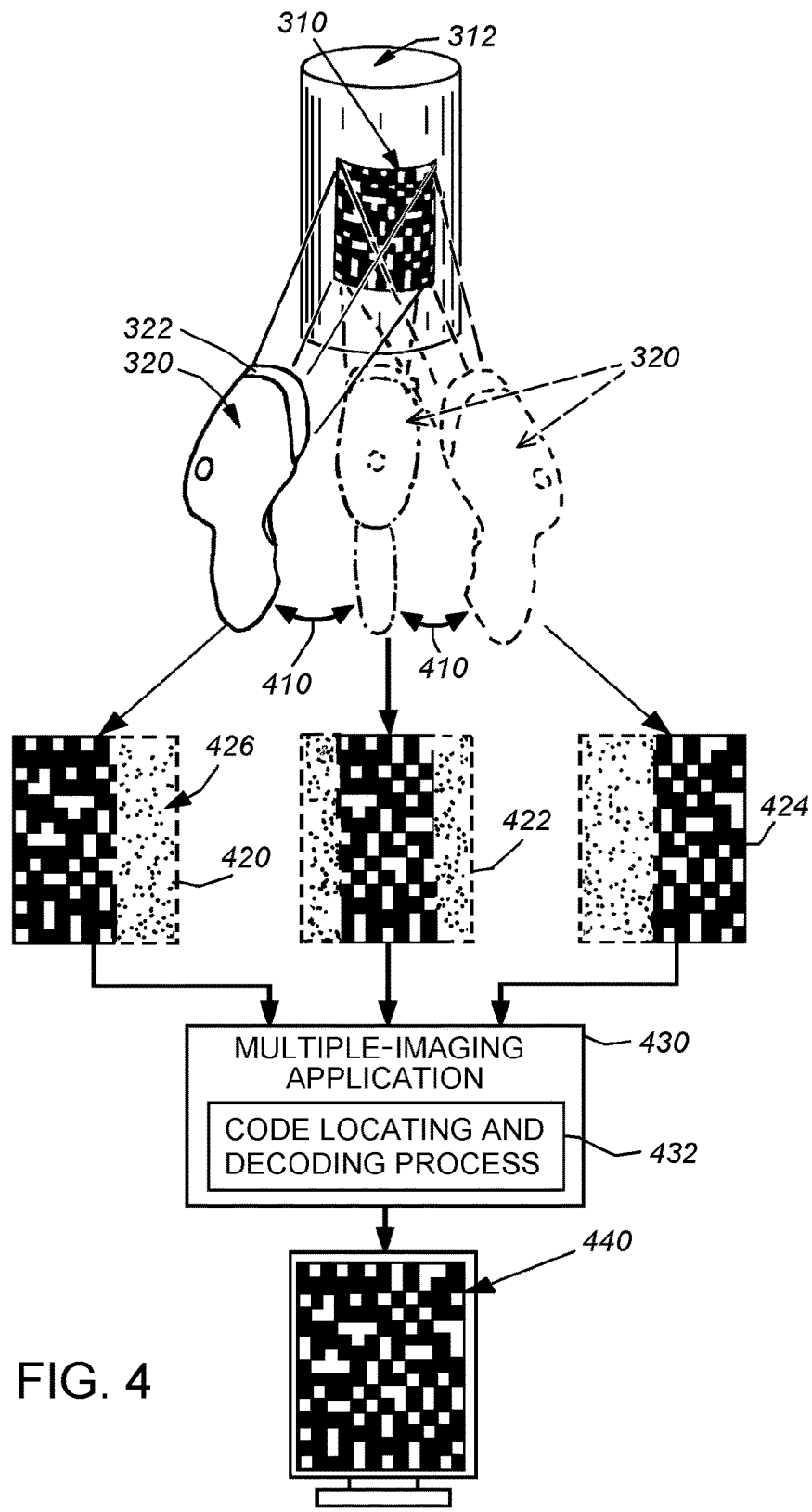
FIG. 4 is a schematic diagram of a procedure for combining a plurality of images derived from the symbol on the object in accordance with the implementation of FIG. 3.

FIGS. 3 and 4 detail an exemplary setup and associated procedure for reading a symbol 310 disposed on an object 312 in accordance with an embodiment of this invention. In this illustrative example, the symbol is a conventional "2D" barcode. The barcode 310 includes alphanumeric data (and other data types), which relate to the part 312, or other parts/processes. The barcode can be applied using ink, paint or an etching process. In this example, the barcode 310 is applied on a surface of the part that is generally cylindrical. Because the surface is cylindrical, the barcode 310 will differentially reflect light with respect to different portions of the surface. In other words, applying a direct, high-angle illumination to the barcode will render some portions readable, and other portions unreadable (generally, because light is not reflected well enough from these portions to provide an appropriate image to the reader). In the example of a printed barcode, the front section of the barcode will be more readable than the sides. Conversely, an etched or peened barcode is more-effectively read using low-angle illumination, particularly when viewed directly normal thereto. However, such low-angle illumination, applied to the center of the code 310, will render the center most-readable, and the sides less readable. In this example, the symbology reader 320 is a conventional hand held device with an illuminator 322 that can apply high-angle and/or low-angle illumination—or a combination of high and low-angle illumination.

In order to insure that a barcode is read with the greatest accuracy and likelihood of success, the reader of this embodiment includes an imaging application 430 that allows the acquisition of multiple images within a single reading operation. This application can be run on a separate computing device or processor, or can be part of a processor that is embedded in the reader itself. In the illustrative embodiment, a successfully read image can be obtained and displayed/decoded using otherwise conventional barcode locating and decoding application(s) 432 that are also resident in the reader and work in conjunction with (or as part of) the multiple-imaging application.

Referring further to FIG. 4, the exemplary reader 320 is moved through a plurality of angular orientations using, for example, a hand-driven, sweeping motion (arrows 410). This sweeping motion, which can occur in a number of directions that are transverse to each other, allows the reader 320 to view the barcode 310 from a plurality of different points of view. In this example, three separate images are acquired—one image at each of three discrete orientations. These acquired images are, respectively, shown in items 420, 422 and 424. As depicted, each separate acquired image contains some portion of the barcode in a relatively readable form, while the remaining portion (426, for example) is less-clear and/or generally unreadable. By selecting the appropriate combination of orientations through the sweeping motion, the images 420, 422 and 424 each represent a readable portion of the overall barcode, and they collectively comprise a decodable version of the entire code. As will be described further below, the multiple-imaging application 430 recognizes the readable/decodable portions of the barcode and overlays the portions from each image to derive a single decodable image, which is shown on the display 440. Because the application 430 initially attempts to locate and decipher the code in each image, registration is naturally obtained between images as certain portions of the decoded code are known by the application to appear in a given portion of the overall code. That is, the application attempts to fill in a continuous barcode by searching for the appropriate code sections in each image and stitching these sections together through recognition of mutually overlapping sections between adjacent images. The code sections will always appear at the same relative location and, thus, the three images are inherently registered with respect to each other.

Figure 5:
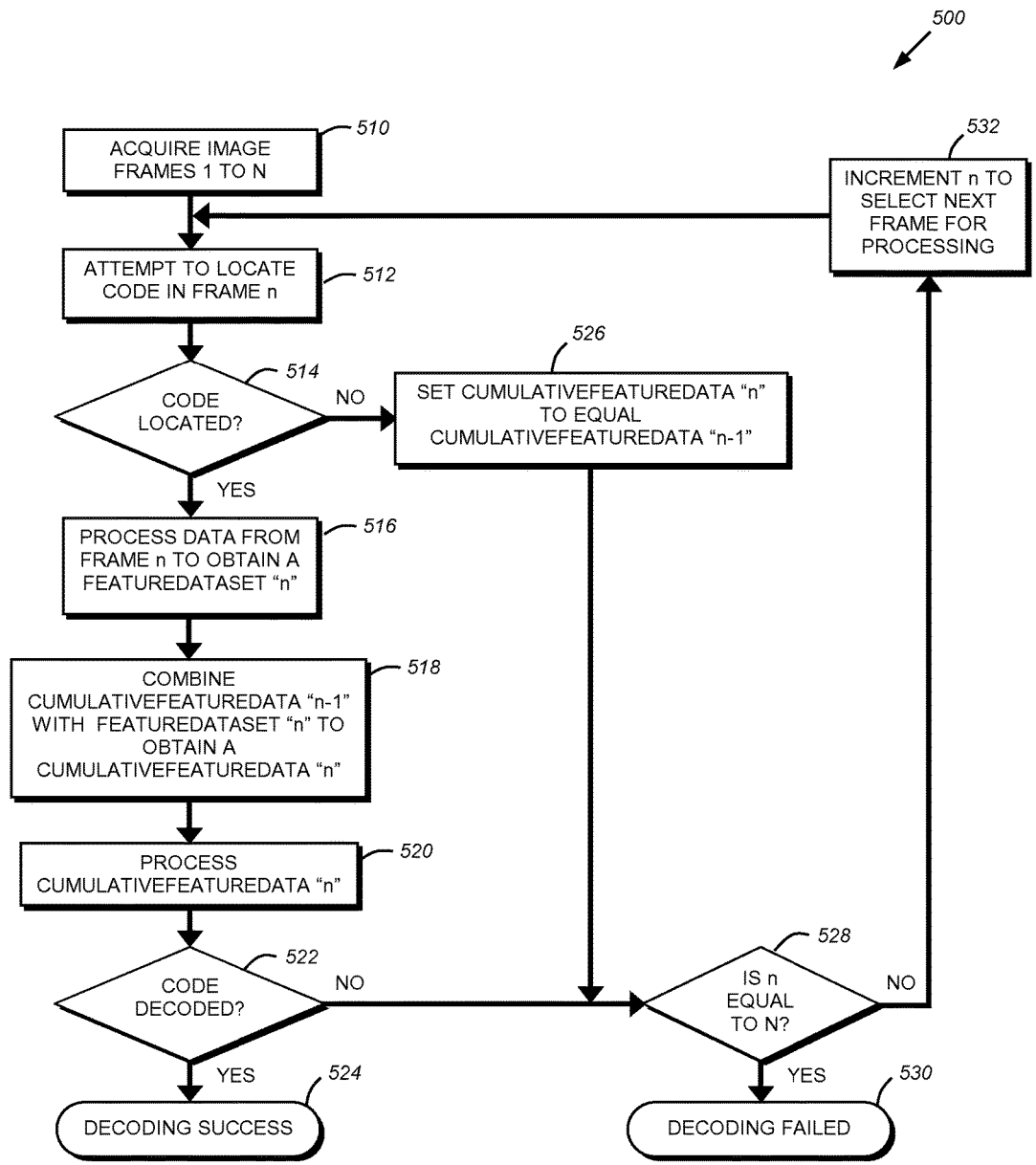
FIG. 5 is a flow diagram of a generalized procedure for combining a group of "n" acquired image frames according to an illustrative embodiment of this invention.
Figure 6:
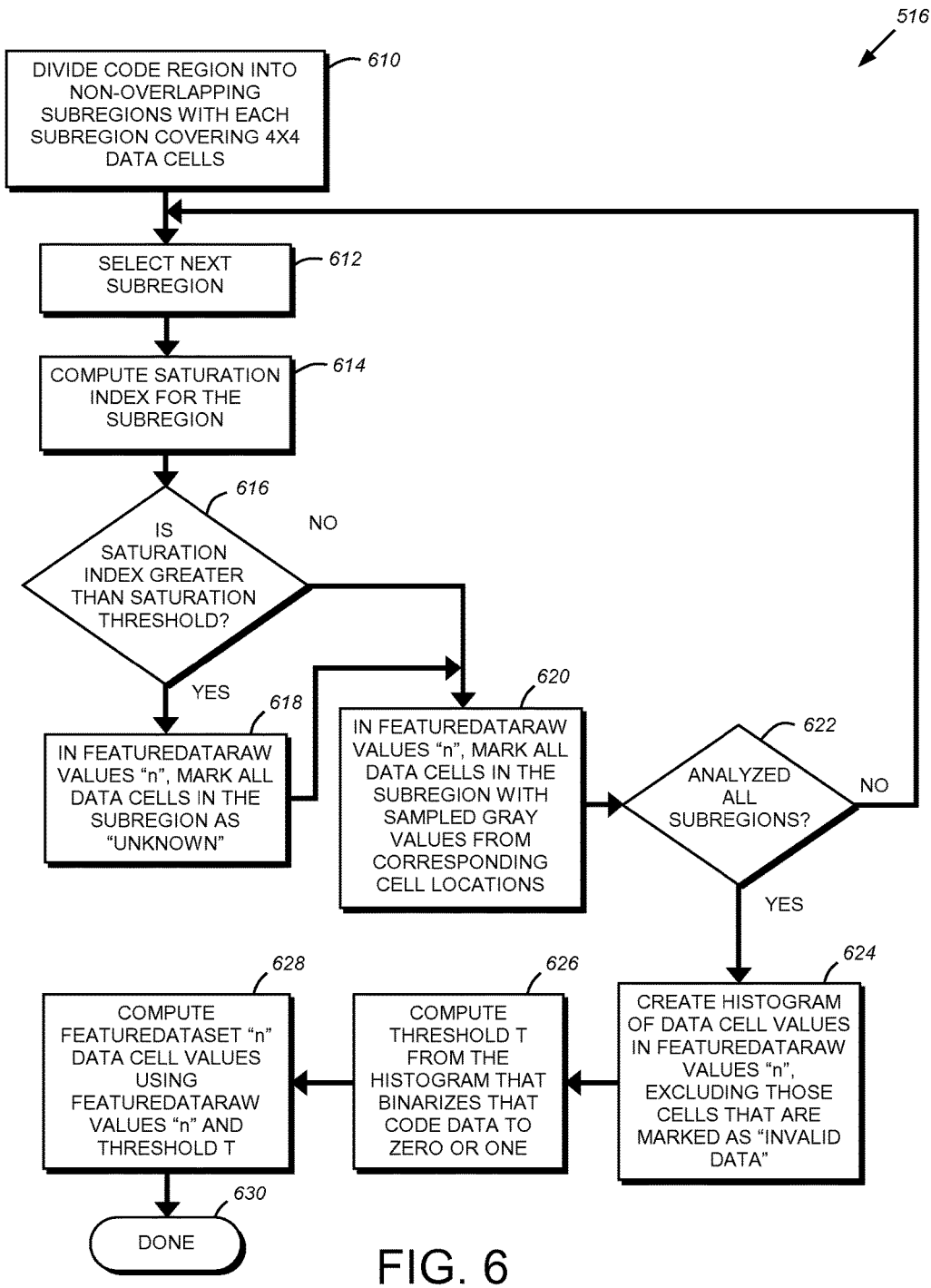
FIG. 6 is a flow diagram of a procedure for obtaining the data set from each image frame for use in the generalized procedure of FIG. 5.

Reference is now made to FIGS. 5 and 6, which detail a generalized procedure 500 for combining a plurality (N) image frames of an exemplary symbology code, which are each acquired under differing conditions/orientations, into a single, complete and decodable representation of the symbol. The procedure 500 is employed as part of the multiple-imaging application 430 referenced above. It should be clear that the number of images acquired to decode a symbol is highly variable. In an illustrative embodiment, the number of acquired images may be set to vary depending upon how many image frames are needed to successfully decode the symbol. In other words the procedure acquires fewer or greater images until the code is successfully read. A maximum number of images (N) is acquired after which the read either succeeds or fails. Alternatively, a number N of images may be acquired regardless of an intervening successful read.

In the procedure 500, image frames 1 to N are acquired in step 510 using any acceptable symbology reader and illumination implementation, including, but not limited to, the illustrative reader arrangements described above and below. Once the image frames are acquired, the current frame (denoted as n) is analyzed using conventional symbology decoding software in an attempt to locate the code within the field of view (step 512). In the case of the first image "n" equals 1. If the code is located (decision step 514), then the data from frame n is processed in 516 to obtain a value termed FEATUREDATASET "n" this value includes the readable portion of the code.

Note that it is expressly contemplated that the procedures for processing multiple image frames and acquiring further image frames can be overlapped so that processing of already-acquired images occurs in one part of the system while acquisition of new images, which may or may not be processed (depending in part upon whether successful reading has already occurred) occurs in another part of the system. The ordering and frequency of acquisition and processing operations is, thus, highly variable.

Referring to FIG. 6 further details the substeps of main procedure step 516 (FIG. 5) for obtaining the value FEATUREDATASET "n" using the image data frame "n" and a location in the frame "n". In alternate embodiments a variety of equivalent techniques and processes can be employed to process the data. FIG. 6 provides one illustrative procedure, which is now further described. In substep 610 the region of the image frame identified as containing a code is divided into non-overlapping subregions, with each subregion covering (for example) 4×4 data cells. In this example, each data cell represents a discrete pixel arrangement that is representative of a given data code value. In substep 612, the procedure selects an initial (or next) subregion from the divided group. In substep 614 the Saturation Index for this subregion is then selected. The Saturation Index for the subregion represents the percentage of pixels in the subregion having a gray level that is greater than or equal to a predetermined value identified as SATURATIONGRAYSCALETHRESHOLD. If the saturation index is greater index is greater than SATURATIONGRAYSCALETHRESHOLD (decision substep 616), then an array FEATUREDATARAWVALUES "n" is marked so that all data cells in that subregion are considered unknown (substep 618). The procedure then branches to substep 620 in which the array FEATUREDATARAWVALUES "n" is filled so that all data cells in the subregion are marked with sample gray values from corresponding cell locations. Note that the decision substeps 616 also branches directly to substep 620 if the saturation index is not greater than the value SATURATIONGRAYSCALETHRESHOLD. After substep 620, the decision substep 622 determines whether all subregions have been analyzed. If not, the procedure branches back to substep 612, and the above-described substeps (612, 614, 616, 618 and/or 620) are repeated for the next subregion in the code (based upon the division in substep 610).

Finally, when all subregions have been analyzed, the decision substep 622 branches to substep 624. At this time, the procedure creates histogram of data cell values in the array FEATUREDATARAWVALUES "n". This derived histogram excludes any cells that are marked as being invalid data. Then, in substep 626, a threshold value T is computed from the histogram. This threshold value T essentially binarizes the underlying symbol code data to either a zero value (for grayscale less than T) or one (for grayscale greater-than-or-equal-to T). This substep (626) can be accomplished using the well-known Otsu algorithm. This algorithm can be referenced in the well-known article by N. Otsu, *A Threshold Selection Method from Gray Level Histograms*, IEEE Transcript on Systems, Man and Cybernetics, Volume 9, pages 62-66, March, 1979; the teachings of which are expressly incorporated herein by reference, by way of further background. Finally, in substep 628, the procedure computes the data cell values in FEATUREDATASET "n" using FEATUREDATARAWVALUES "n" and the threshold T. In general, the system can compute respective values M0 and M1 as mean gray values of the portions of the histogram distribution that are below the threshold T and above the threshold T. For each data cell c in the code, the procedure of substep 628 can be accomplished in accordance with the following exemplary program instructions:
For each data cell c, in the code,

```
if (FEATUREDATARAWVALUES "n" at c = "unknown")
    FEATUREDATASET "n" at c = "unknown"
else if (FEATUREDATARAWVALUES "n" at c < T)
    FEATUREDATASET "n" at c = (T –
    FEATUREDATARAWVALUES "n" at c)/(T – M0)
else if (FEATUREDATARAWVALUES "n" at c >= T)
    FEATUREDATASET "n" at c =
    (FEATUREDATARAWVALUES "n" at c – T)/(M1 – T)
```

Following substep 628 of the processing of the data from frame "n" in accordance with step 516 is complete (substep 630), and the procedure 500 (refer again to FIG. 5) continues for that frame in step 518. An array CUMULATIVEFEATUREDATASET "n–1" is provided by the procedure 500, representing all FEATURESETDATA data accumulated in the frames, up to, but not including, the current frame "n" (hence, the modifier "n–1"). Thus, this array represents the previous cumulative data on the code derived by the multiple image frames. In the case of the first image frame (n=1) the CUMULATIVEFEATUREDATASET is a null value. Thus, for the first image frame, no cumulative data is combined therewith. Once the prior CUMULATIVEFEATUREDATA "n–1" is retrieved, it is combined with the current FEATUREDATASET "n" to obtain a new value for CUMULATIVEFEATUREDATA "n" (step 518).

CUMULATIVEFEATURE DATA "n" consists of Cumulative_confidence_0 "n" which indicates confidence values for each data cell that the value is "0", and Cumulative_confidence_1 "n" which indicates confidence values for each data cell that the value is "1". This data is computed by combining data from previous frames (represented by CUMULATIVEFEATUREDATA "n–1") and data from current frame (represented by FEATUREDATASET "n"). This computation is performed according to the following exemplary program instructions:
1. Initialize

```
Cumulative_confidence_0 "n" = Cumulative_confidence_0 "n–1"
Cumulative_confidence_1 "n" = Cumulative_confidence_1 "n–1"
```

2. For each data cell c, in the code,

```
if (FEATUREDATASET "n" at data cell c = "unknown")
    Do nothing
else if (FEATUREDATASET "n" at data cell c = "0")
    Cumulative_confidence_0 "n" at data cell c =
    Cumulative_confidence_0 "n–1" at data cell
    c +FEATUREDATASET "n" at data cell c
else if (FEATUREDATASET "n" at data cell c = "1")
    Cumulative_confidence_1 "n" at data cell c =
    Cumulative_confidence_1 "n–1" at data cell c +
    FEATUREDATASET "n"
    at data cell c
```

The current value CUMULATIVEFEATUREDATA "n" is then processed according to step 520. This processing employs conventional or custom decoding software that derives the underlying data from a predetermined code format. In the above described step 518, the procedure 500 accumulates evidence for "0" and "1" values separately for each cell over several frames. After each frame, the procedure 500 now attempts a decision based on that evidence according to the following exemplary program instructions and further steps:
1. For each data cell c, in the code,

```
if ((Cumulative_confidence_0 "n" at c – Cumulative_confidence_1
    "n" at c) > confidence threshold
    Data Cell Value for decoding = "0"
else if ((Cumulative_confidence_1 "n" at c –
    Cumulative_confidence_"n" at c) > confidence threshold
    Data Cell Value for decoding = "1"
else
    Data Cell Value for decoding = "unknown"
```

2. Decoding of the code is then attempted using Data Cell Values obtained above. For some symbologies such as DataMatrix code that support Reed-Solomon error correction, the value "unknown" can be treated as a known erasure. Using this approach reduces the error correction capacity required to handle these codes.

If a code can be read (decision step 522) then the decoding is deemed a success 524 and this is indicated to the operator.

If, in accordance with decision step 514, a code is not located from image frame n, then the procedure branches to step 516 and the previously value, CUMULATIVEFEATUREDATA "n" is set equal to the value CUMULATIVEFEATUREDATA "n−1", if any. The procedure then branches to decision step 528. Note that decision step 522 alternatively branches to step 528 if the decode is unsuccessful following step 520. In both alternatives, decision step 528 queries whether the number of the current frame n in the sequence is equal to the final frame or maximum number N of frames.

If the final frame (N) is indicated (i.e. n=N), then the procedure 500 has been unable to decode the image using the maximum number of frames that may be acquired by the reader. As such, the system indicates that the decoding has failed in step 530. The user may reattempt the decoding, selecting different orientations, lighting, and other parameters to attempt to achieve a better image combination. If, however, n is not equal to N, then the value n is incremented by 1 to select the next frame for processing (step 532). The procedure 500 then branches back to step 512 in an attempt to locate the readable code in the next, incremented frame n. The procedure 500 then continues through the above-described steps 514, 516, 518, 520, 522, etc. until all N frames an end condition (step 524 or 530) is satisfied.

Figure 1:
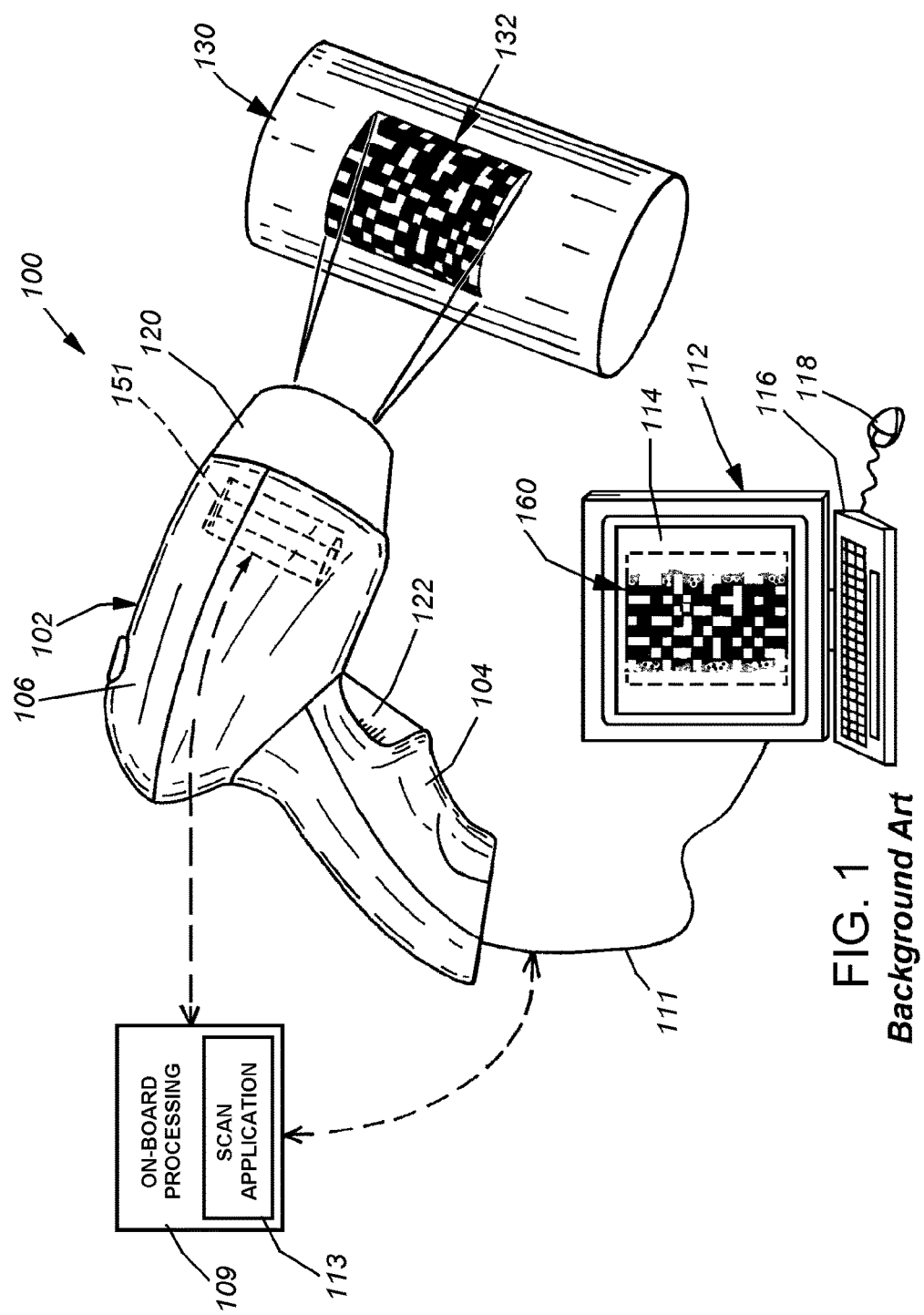
FIG. 1, already described, is a perspective view of a handheld symbology reading system attempting to read a symbol located on an irregular, curved surface, according to the prior art.
Figure 2:
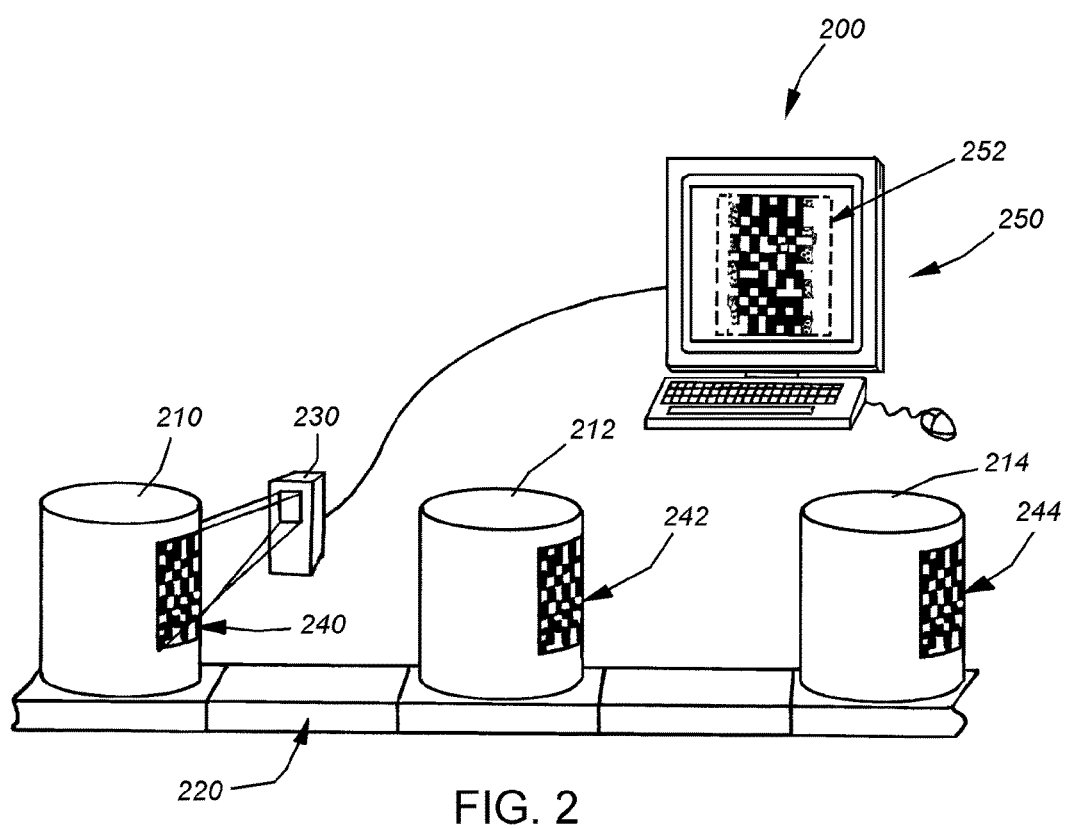
FIG. 2, already described, is a perspective view fixed symbology reader or machine vision detector attempting to read a symbol located on each of a plurality of objects passing down a conveyor line with respect to the reader/detector.
Figure 7:
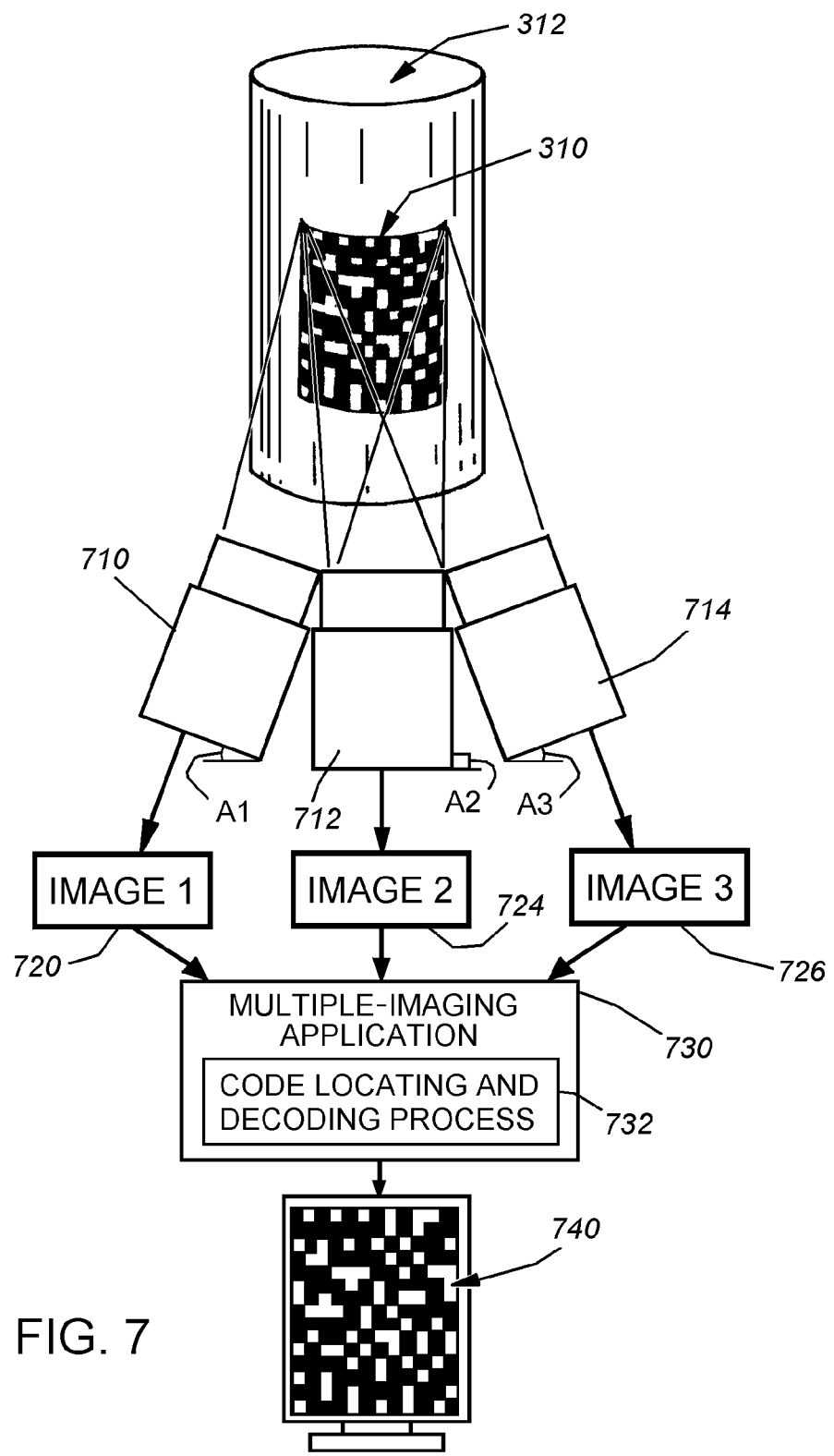
FIG. 7 is a perspective view of a plurality of mounted symbology readers each acquiring multiple image frames of a predetermined symbol located on an irregular, curved surface of an object according to an alternate embodiment.

As described generally above, the acquisition of each of multiple image frames for use in the decoding procedure (for example as shown in FIGS. 5 and 6) can be achieved in a variety of ways. For example, multiple image frames can be derived from a passing object containing a code, such as shown in FIG. 2. In the example of FIG. 7, three separate imaging devices 710, 712 and 714 each acquire a substantially simultaneous image/image frame 720, 724 and 726, respectively. Each image 720, 724, 726 represents a different aspect of the imaged code 310 because each device 710, 712, and 714 is aligned at a different angle (or angles) A1, A2 and A3, respectively relative to a common planar orientation. Note that the image devices 710, 712 and 714 can be angled in a number of different plains so that they are positioned above, below and aside the code. As described above, each image 720, 724 and 727 is combined by a version of the multiple-imaging application 730 and a code locating/decoding application 732. This application can execute a version of the procedure 500 described above, or another acceptable procedure for combining acquired sections of the overall code. In a successful run of the procedure, the displayed complete code 740 is achieved.

Figure 8:
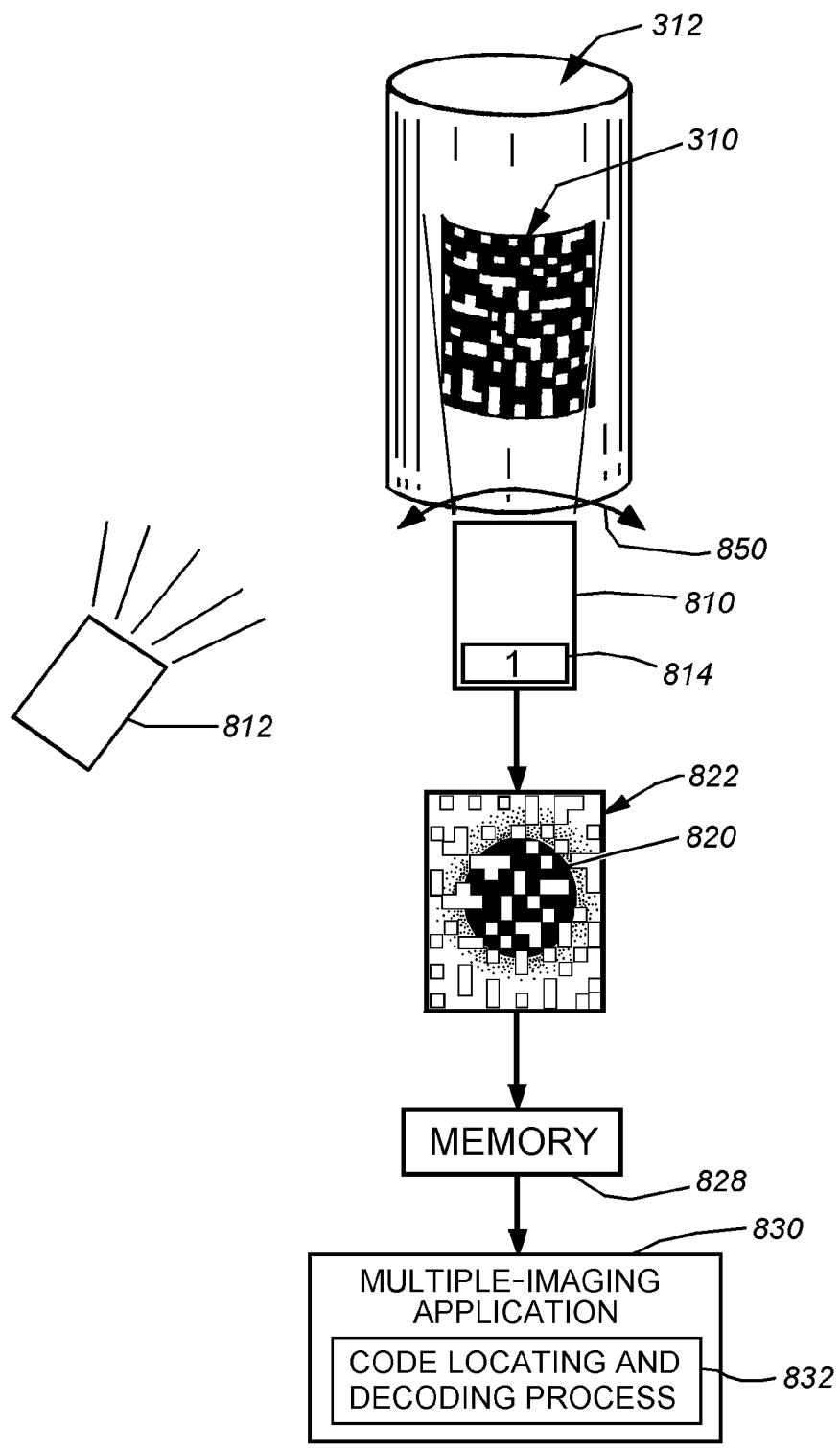
FIG. 8 is a perspective view of a handheld or mounted reader acquiring a first image using a first lens and/or illumination setting according to an alternate embodiment.
Figure 9:
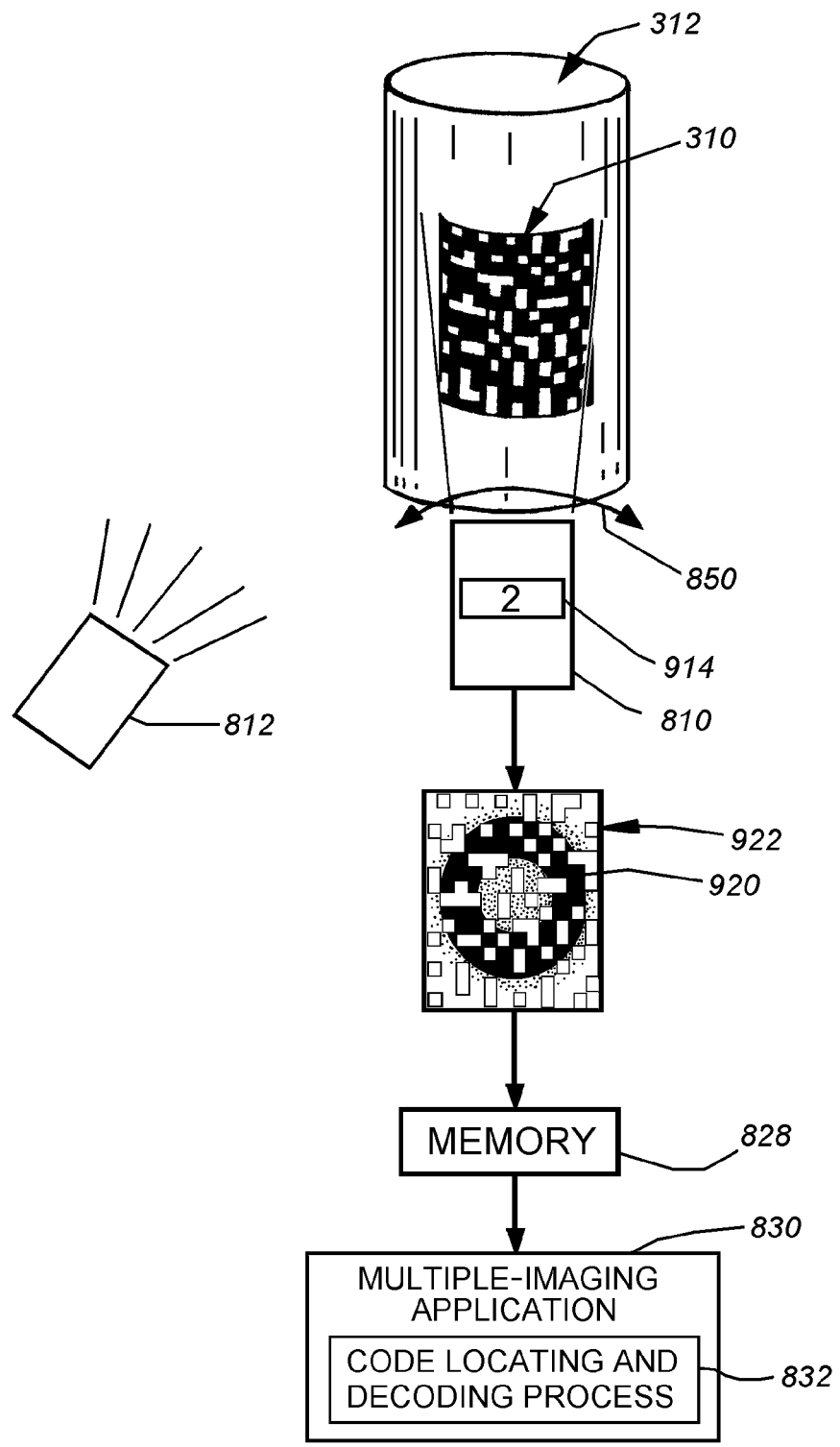
FIG. 9 is a perspective view of a handheld or mounted reader acquiring a second image using a second lens and/or illumination setting according to the embodiment of FIG. 8.
Figure 10:
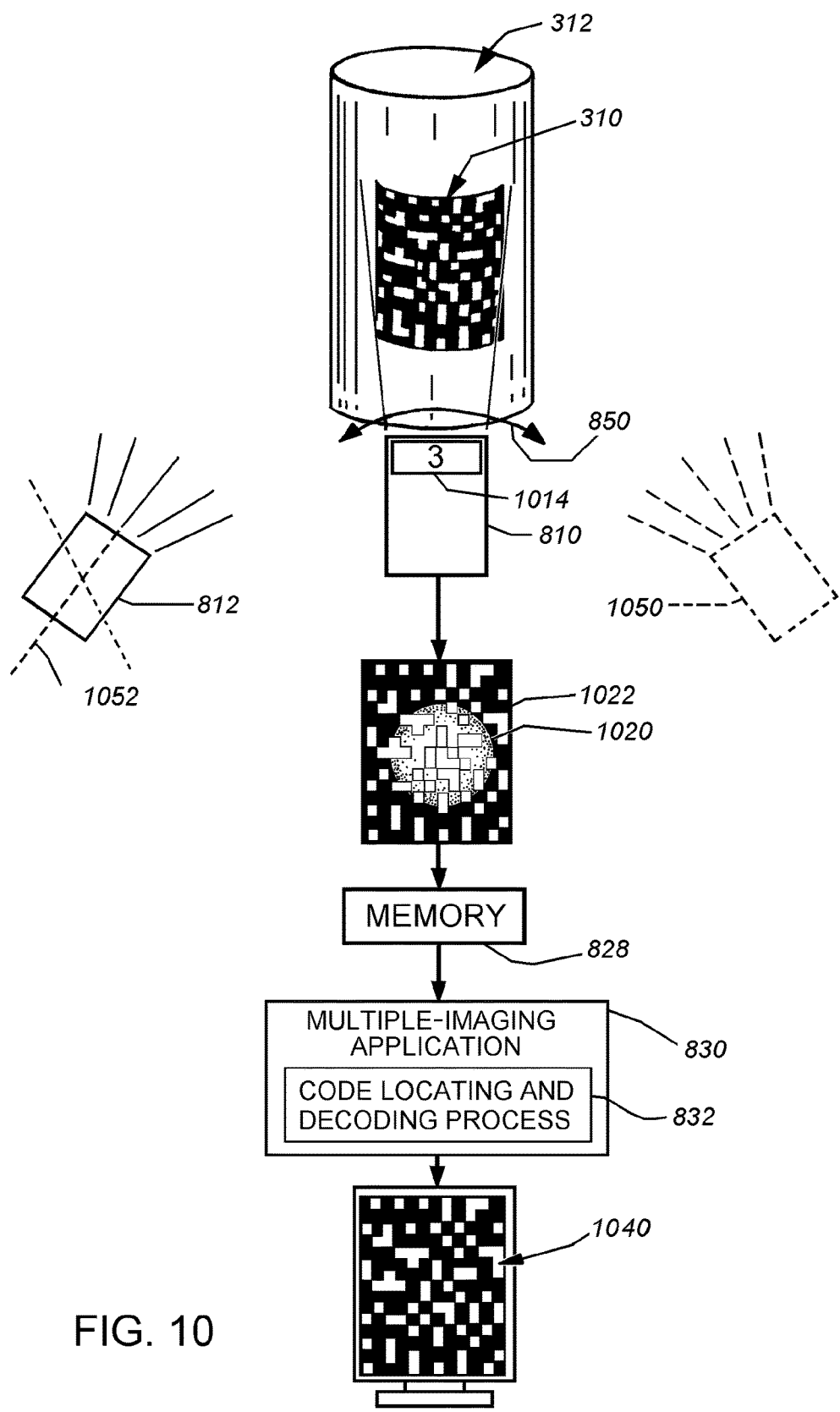
FIG. 10 is a perspective view of a handheld or mounted reader acquiring a third image using a third lens and/or illumination setting, and decoding the associated symbology using a combination of the first through third images, according to the embodiment of FIG. 8.

FIGS. 8-10 detail another embodiment of a decoding system and method according this invention. This embodiment allows the use of a single imaging device, or a plurality of imaging devices arranged at appropriate orientations with respect to the barcode 310. In FIG. 8, the imaging device 810 acquires an image of the barcode 310 with the light provided by an illuminator 812 of any acceptable design and appropriate performance. The imaging device is defined by a plurality of parameters (for example, focus, zoom, aperture, contrast and/or any other settable parameter. The predetermined setting is designated by the number "1" 814. For example, setting 1 can comprise a first zoom setting). As such, the central portion 820 of an acquired image 822 shows good contrast and readability. This image is stored into an appropriate memory 828, and thereafter forwarded to a version of the multiple-imaging application 830 and an associated code locating/decoding application 832. A double-arrow 850 is shown with respect to the imaging device 810. This arrow symbolizes that the imaging device can be located at any desired orientation with respect to the surface of the object 312 and its barcode 310. Likewise, the illuminator 812 is optional, and/or the illuminator(s) can be located at any position/orientation with respect to the barcode 310. As will be described further below, one of the variable parameters that can be altered for discrete, acquired images is the location/orientation of illumination, and/or the type of illumination used (for example high-angle and low-angle, differing colors, etc.).

The next image is acquired in accordance with FIG. 9. In this embodiment, the parameters of the imaging device 810 have been altered to define parameter setting 2 914, thereby producing a clear, easily decodable region 920 of the acquired image 922 that differs from the region 820 in the previous image of FIG. 8 (used for parameter setting 1 (814)). This new acquired image 922 is forwarded to the memory 828 to be acted upon by the multiple-imaging application 830.

In FIG. 10, the imaging device is set to its setting 3 parameters 1014. The result of this setting is, again, to alter the acquired image 1022 so that the newly acquired image exhibits yet another varying region of clarity/readability 1020. This image frame 1022 is forwarded to the memory 828. By setting the correct parameters for each image frame, the three regions 820, 920 and 1020 collectively constitute an overlapping (or contiguous/adjacent) version of the entire barcode, which can be effectively read/decoded as a whole. The collective frames from the plural acquisitions are forwarded to the memory 828 where it and other frames are acted upon by the multiple-imaging application (in a manner generally described above) and thereafter combined into the displayed decodable image 1040.

Note that the illuminator 812 has been deactivated (symbolized by a phantomized "X" 1052), and the illuminator 1050 (shown in phantom) has been activated in FIG. 10—or the illuminator 812 (and/or its transmitted light) has been reoriented to this new position. This is one of the many imaging parameters that maybe varied in accordance with this embodiment. In alternate embodiments, the illuminator 812 can be retained, and only the imaging device parameters are changed.

Figure 11:
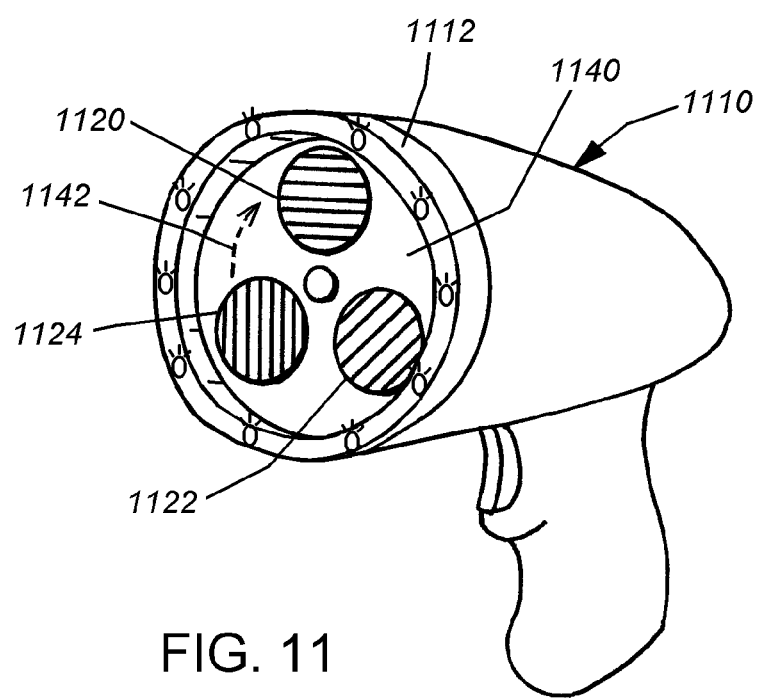
FIG. 11 is a front perspective view of a multiple-image-acquiring handheld reader according to an alternate embodiment.

According to another embodiment, shown in FIG. 11, a hand-held symbology reader 1110 is provided. This reader 1110 includes an integrated illuminator 1112 of a relatively conventional design, which surrounds the reader's imaging lenses. 1120, 1122 and 1124. The reader 1110 allows three or more images to be acquired simultaneously, or within rapid succession of each other. In one embodiment, three separate imagers (not shown) optically connected with lenses 1120, 1122 and 1124 are employed to simultaneously acquire respective images. Each imager is provided with a different focus-setting, aperture-setting, orientation, and/other parameter setting. Thus, the image acquired by each imager will be discrete and different. An image of the symbol can be acquired in a single orientation or each imager can acquire several frames while the user passes the reader through different orientations. The use of multiple imagers allows the acquisition process to be accelerated. In another embodiment, a single imager (also not shown) can be employed within the interior of the reader and the front face 1140 of the reader can be rotated (phantomized arrow 1142) to locate each of a plurality of specialized lenses 1120, 1120, 1124 at the front face of the reader. Each of these lenses would provide a different set of imaging parameters. A motor or other actuator would be used to rotate the face 1142. In a further alternate embodiment, the internal imager can rotate while the face remains stationary or mirrors, lightguides, or equivalent optical-image-carrying mechanisms can be used to route image information to the imager from each lens at the appropriate time.

While the above description generally contemplates that at least some of the multiple images can be acquired using discrete, differing image parameters therebetween—for example differing orientations, apertures, zoom, lighting, etc., some symbols may be generally readable using a single set of image parameters (i.e. all images acquired from a similar orientation, lighting, and camera setting). The above-described principles of stitching together a single, readable representation of the symbol can, thus, be applied in cases where all images are acquired using the same parameters. This approach is particularly useful, for example, in overcoming varying electronic noise that may occur between images and slight variability in lighting due to ambient condition. This for the purposed of this description, acquiring multiple images can include acquiring images that are characterized by the same image parameters.

It should be clear that a system and method in accordance with one of the embodiments herein provides an easy-to use and effective technique for more reliable decoding symbols. This technique does not significantly increase reading speed, nor does it significantly increase (or alter) the hardware or software required by a conventional reader. However, contrary to prior techniques which may acquire multiple images, but select and decode only the best image from a group, the illustrative system and method efficiently takes the best features of the code in each of a plurality of images to stitch together a more-decodable symbology code.

The foregoing has been a detailed description of illustrative embodiments of the invention. Likewise, the drawings presented herein should be considered as only illustrative of particular examples of the invention. Various modifications and additions can be made without departing from the spirit and scope if this invention. Each of the various embodiments described above may be combined with other described embodiments in order to provide multiple features. Furthermore, while the foregoing describes a number of separate embodiments of the apparatus and method of the present invention, what has been described herein is merely illustrative of the application of the principles of the present invention. For example, the mechanism by which multiple images with varying imaging parameters are acquired is highly variable. The foregoing examples of readers and reading arrangements, thus should not be taken as exclusive or limiting as to this aspect of the invention. Likewise, while a particular procedure for processing multiple images with differing parameters has been shown and described, this procedure is illustrative and other procedures are expressly contemplated. In alternate embodiments a reading procedure may entail use of images that are registered with each other by a machine vision tool that recognizes fiducials and/or patterns rather than contiguous/overlapping code sections. In other words, the multiple images are stitched together into a uniform, readable image using machine vision global registration tools that act upon edges and/or other features to provide registration rather than attempting to initially attempting to locate and decode code sections. After global registration, decoding of the image can occur using, for example, conventional decoding processes. Additionally, it is contemplated that the acquisition of image frames at each of a plurality of orientations can be achieved by moving the symbol in a number of ways instead of (or in conjunction with) movement of the imager. For example, movement of the object and/or symbol can occur linearly as described above, or the object/symbol can be rotated and twisted, such as would occur with an object held in a multi-axis robot end effector. Moreover, it is expressly contemplated that the procedures of the system and method described herein can be implemented as hardware, software that comprises a computer-readable medium consisting of program instructions, or a combination of hardware and software. Accordingly, this description is meant to be taken only by way of example, and not to otherwise limit the scope of this invention.

What is claimed is:

1. A system for decoding a symbol that represents a data set on an object comprising:
an imaging assembly; and
a processor, operatively connected to the imaging assembly that includes a multiple-imaging process constructed and arranged to process a plurality of image frames of the symbol, wherein each of the plurality of image frames is divided into a plurality of sub-regions, and the processor being further constructed and arranged to decode predetermined code data from at least some of the plurality of image frames containing the portion of the symbol, and to combine the predetermined code data from the at least some of the plurality of image frames to define a decodable version of the data set represented by the symbol,
wherein at least one of the plurality of the image frames are characterized by discrete, differing image parameters from another of the plurality of the image frames, wherein the imaging assembly is constructed an arranged to acquire at least some of the image frames from a plurality of different orientations with respect to the symbol and so that the image parameters comprise each of the plurality of different orientations.

2. The system as set forth in claim 1 wherein the multiple-imaging procedure includes a symbology-decoding procedure that decodes the predetermined code data in respective of the plurality of image frames, and the multiple-imaging procedure being further constructed and arranged to determine a successful, or unsuccessful, decoding of the symbol based upon, respectively, whether combining the predetermined code data in the respective of the plurality of image frames defines, or does not define, a complete data set represented by the symbol.

3. The system as set forth in claim 2 wherein the multiple-imaging procedure is further constructed and arranged to indicate the successful decoding of the symbol when a predetermined number of image frames that is less than or equal to a maximum number of image frames from the plurality of image frames is decoded to define the complete data set.

4. The system as set forth in claim 1 wherein the imaging assembly is located in a handheld symbology reader.

5. The system as set forth in claim 1 wherein the imaging assembly comprises a plurality of imagers located at different orientations with respect to the symbol.

6. The system as set forth in claim 1 wherein the symbol is moving with respect to the imaging assembly that is substantially stationary so that each of the image frames is acquired at each of a plurality of orientations with respect to the imaging assembly.

7. The system as set forth in claim 1 wherein the imaging assembly is constructed and arranged to acquire at least some of the plurality of images based upon, respectively, each of a plurality of predetermined image parameters other than orientation.

8. The system as set forth in claim 7 wherein the image parameters comprise at least one of lens focus, lens aperture, lens zoom, illumination type and illumination orientation.

9. A system for decoding a symbol that represents a data set on an object comprising:
   an imaging assembly; and
   a processor, operatively connected to the imaging assembly that includes a multiple-imaging process constructed and arranged to process a plurality of image frames of the symbol, wherein each of the plurality of image frames is divided into a plurality of sub-regions, and the processor being further constructed and arranged to decode predetermined code data from at least some of the plurality of image frames containing the portion of the symbol, and to combine the predetermined code data from the at least some of the plurality of image frames to define a decodable version of the data set represented by the symbol,
   wherein at least one of the plurality of the image frames are characterized by discrete, differing image parameters from another of the plurality of the image frames, wherein the imaging assembly is constructed an arranged to acquire at least some of the image frames from a plurality of different orientations with respect to the symbol and so that the image parameters comprise each of the plurality of different orientations, wherein the imaging assembly comprises a plurality of imagers located at different orientations with respect to the symbol.

10. A system for decoding a symbol that represents a data set on an object comprising:
   an imaging assembly comprising an imaging device; and
   a processor, operatively connected to the imaging assembly that includes a multiple-imaging process constructed and arranged to process a plurality of image frames of the symbol, wherein each of the plurality of image frames is divided into a plurality of sub-regions, and the processor being further constructed and arranged to decode predetermined code data from at least some of the plurality of image frames containing the portion of the symbol, and to combine the predetermined code data from the at least some of the plurality of image frames to define a decodable version of the data set represented by the symbol,
   wherein the imaging device comprises a plurality of imaging devices located on a single handheld symbology reader, wherein each of the plurality of imaging devices is configured to capture differing image parameters to another of the plurality of imaging devices.

* * * * *